Sept. 27, 1938. W. B. LOCKE 2,131,227
LABELING MACHINE
Filed Aug. 5, 1935 4 Sheets-Sheet 2

INVENTOR.
William B. Locke
BY
Edwin C. McRae
ATTORNEY.

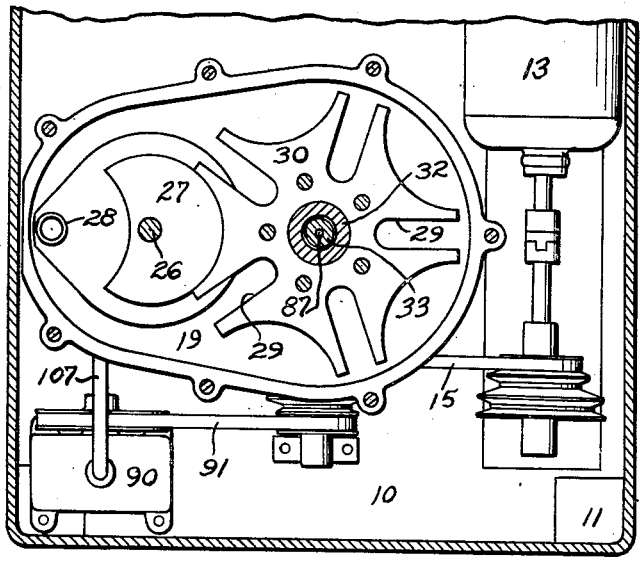
Fig. 6.
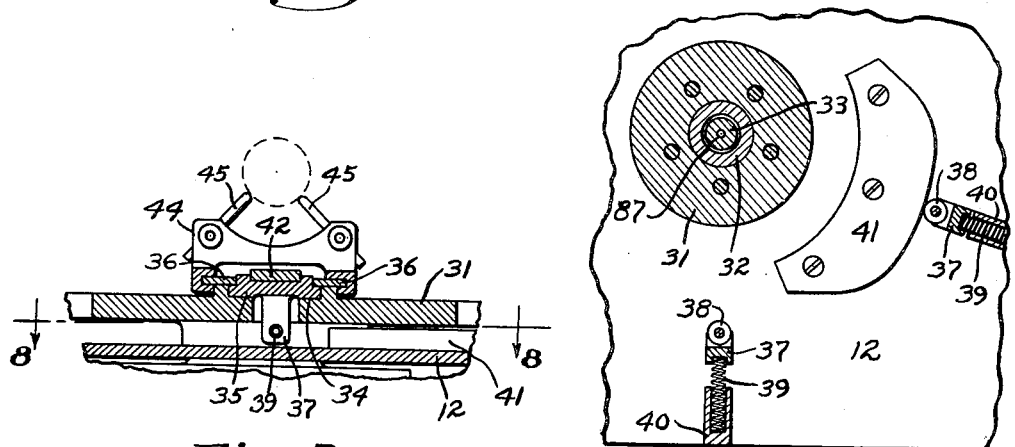
Fig. 7.
Fig. 8.
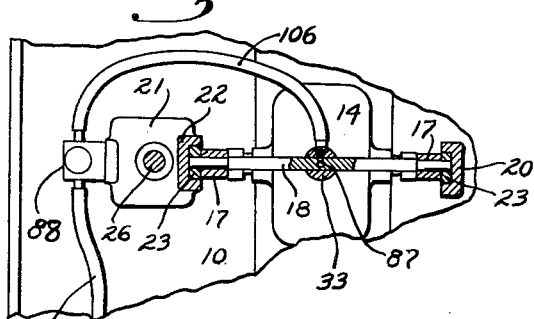
Fig. 16.

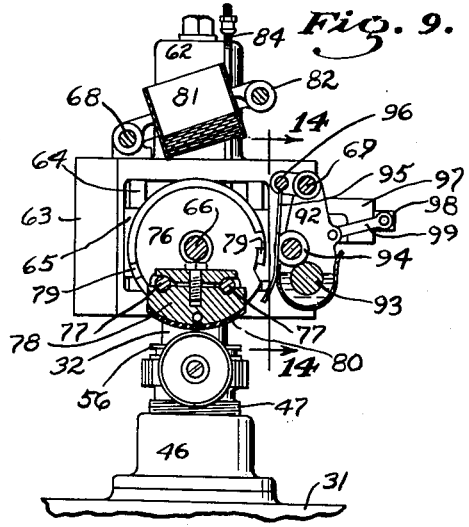
Fig. 9.
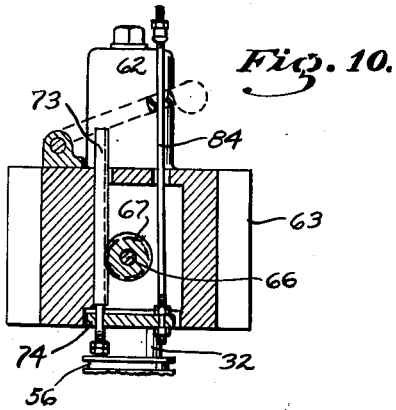
Fig. 10.
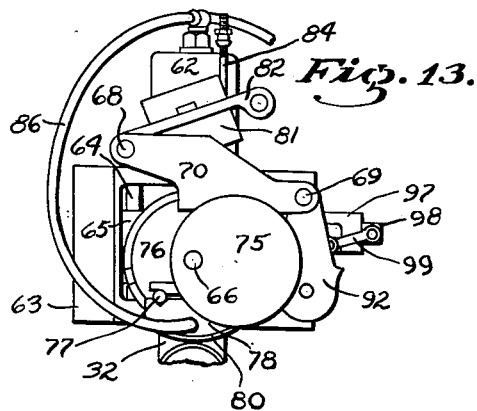
Fig. 13.
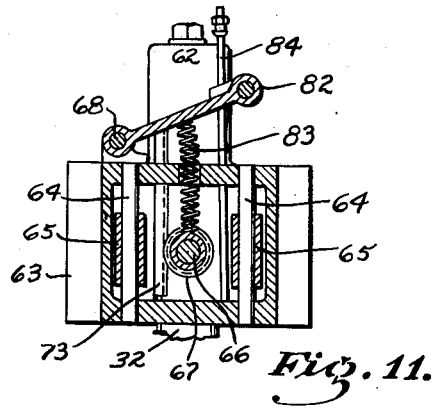
Fig. 11.
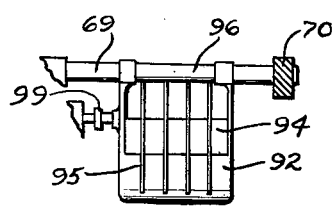
Fig. 14.
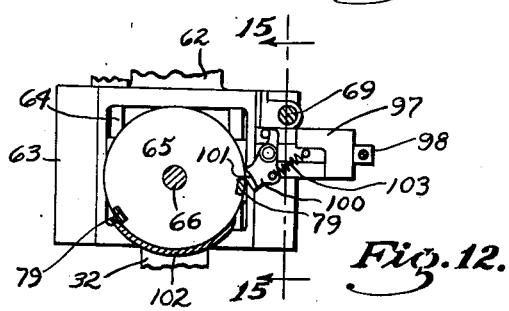
Fig. 12.
Fig. 15.
INVENTOR.
William B. Locke
BY Colwin C. McRae
ATTORNEY.

Patented Sept. 27, 1938

2,131,227

UNITED STATES PATENT OFFICE 2,131,227

LABELING MACHINE

William B. Locke, Ferndale, Mich.

Application August 5, 1935, Serial No. 34,728

14 Claims. (Cl. 216—53)

The object of my invention is to provide a labeling machine especially adapted to glue labels upon containers such as bottles or the like. The specific object of this invention is to provide a machine in which an operator may insert bottles and the same will be labeled on one side or on both sides, as may be desired, without further attention by the operator.

A unique feature of my improved machine is that the labels are glued over their full back surfaces to insure smooth and even contact with the bottle. Heretofore, all labeling machines known to the applicant applied glue only to two opposite edges of the labels, so that the center portion of the label remained unglued. For this reason, such machines were not especially suitable for glueing labels upon flat bottles, as a slight swelling of the label caused same to bow out from the bottle at the center.

Still a further object of my invention is to provide a machine which will apply labels to round, flat, square or tapered bottles. In this respect my device is believed to be far superior to other labeling machines, as such machines invariably are limited to operate upon a small range of bottle shapes.

An increased operating speed over existing machines is not a predominant feature of my machine, as its main characteristic is that it will apply labels to that class of goods, which, because of the exacting nature of the work, have heretofore been labeled by hand.

With these and other objects in view, my invention consists in the arrangement, construction and combination of the various parts of my improved device, as described in the specification, claimed in my claims, and illustrated in the accompanying drawings, in which:

Figure 6 is a sectional view, taken on the line 6—6 of Figure 1, showing the Geneva motion intermittent drive.

Figure 7 is a sectional view, taken on the line 7—7 of Figure 2, showing the bottle locator.

Figure 8 is a sectional view, taken on the line 8—8 of Figure 7, showing the cam which releases the bottles at the loading station.

Figure 9 is a sectional view, taken on the line 9—9 of Figure 1, illustrating the label carrier and glue applier.

Figure 10 is a sectional view taken on the line 10—10 of Figure 1, showing the label carrier rotating means.

Figure 11 is a sectional view taken on the line 11—11 of Figure 1.

Figure 12 is a sectional view, taken on the line 12—12 of Figure 1, showing the glue roller releasing mechanism.

Figure 13 is a side elevation of the label carrier and associated mechanism, as shown in Figure 9.

Figure 14 is a sectional view, taken on the line 14—14 of Figure 9.

Figure 15 is a sectional view, taken on the line 15—15 of Figure 12, and

Figure 16 is a sectional view, taken on the line 16—16 of Figure 1.

Before describing in detail the construction of my machine, it may be well to mention that in general, my machine comprises a rotating table having five bottle holders equally spaced therearound, which table is intermittently rotated 1/5 of a revolution at a time in synchronism with a vertically reciprocating head. Upon the head are located two label applying devices, together with two label pressing devices. As each bottle is intermittently rotated with the table it first moves to position beneath one of the label applying devices; it then moves under a label pressing device, then under the second label applying device and then under the second label pressing device, the fifth station being the loading and unloading station for the machine. Means, which will subsequently be described, is provided which operates upon the bottle as it moves from the first label pressing device to the second label applying device, and rotates the bottle through 180° so that the second label may be placed on the opposite face of the bottle.

Figure 1:
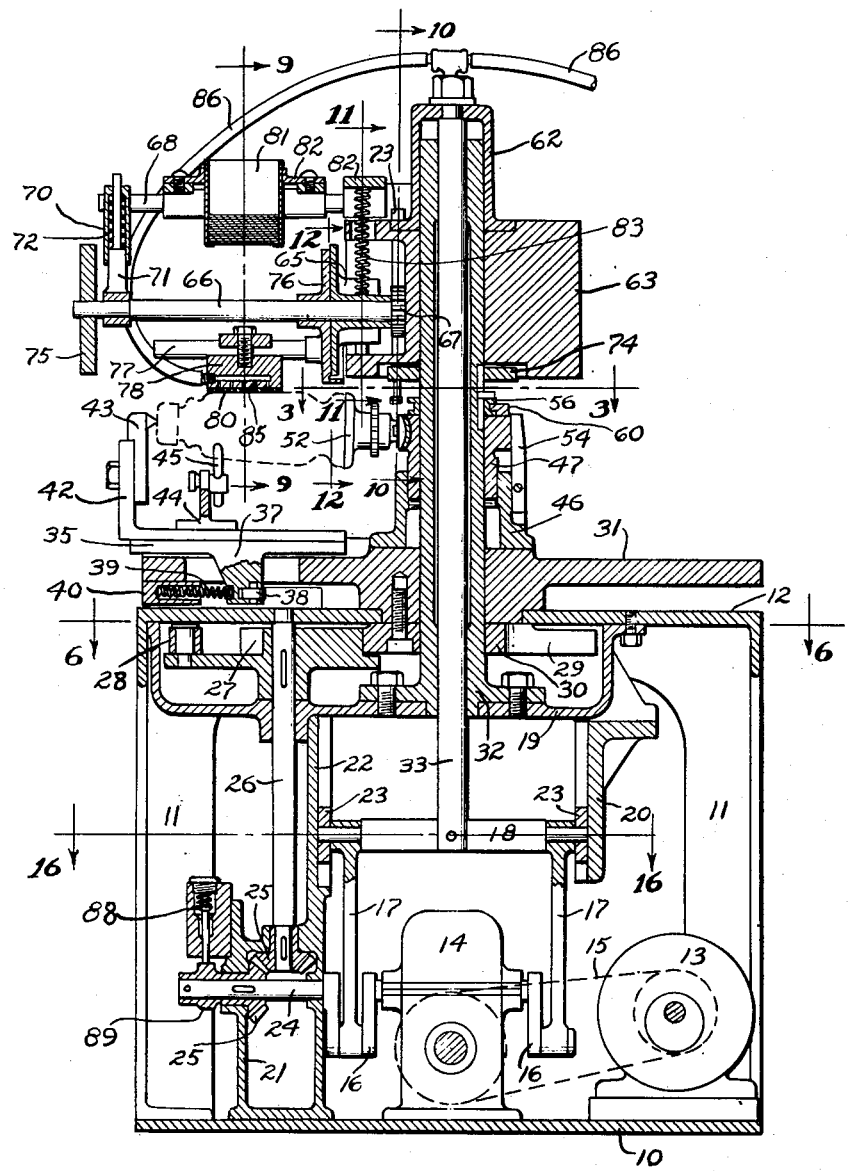
Figure 1 is a vertical central sectional view through my improved machine, showing the major portion of the operating mechanism therein.

Referring to the accompanying drawings, particularly Figure 1, I have used the reference numeral 10 to indicate the base plate of the frame around which my machine is constructed. This frame is of rectangular shape having four angular shaped legs 11, which extend from the base plate 10 upwardly to a top plate 12. I have shown the plate 12 and legs 11 cast integral; however, these may be of built up construction, if desired.

Mounted upon the base plate 10, in a horizontal position, I have provided an electric motor 13, which is connected to a speed reducer 14 through a suitable V belt drive 15. The speed reducer 14 is secured to the base plate 10 at the center thereof, with the reduced speed shaft of the speed reducer extending in a horizontal direction. A pair of crank arms 16 are fixedly secured to each end of said reduced speed shaft, upon which arms a pair of connecting rods 17 are journaled, these connecting rods extending upwardly where they are pivotally secured to a cross beam 18. The beam 18 is guided so that it is permitted only vertical reciprocation as the cranks 16 are rotated.

An intermittent or Geneva motion gear housing 19 is secured to the under side of the top plate 12, and a bracket 20 is secured to this housing, this bracket extending downwardly therefrom. A driving gear housing 21 is secured to the base plate 10, this housing being formed integrally with a bracket 22 which extends upwardly to the housing 19. Both the brackets 20 and 22 are provided with vertical guide channels therein, in each of which a shoe 23 is reciprocally mounted, these shoes being pivotally secured to the respective ends of the cross beam 18. The two brackets 20 and 22 thus form guides for the cross beam.

It will be noted from Figure 1 that one of the crank arms 16 has a shaft 24 formed integrally therewith, which shaft extends, in axial alignment with the slow speed shaft of the speed reducer, through the driving gear housing 21. A pair of miter gears 25 are rotatably mounted in the housing 24, one of the gears being keyed to the shaft 24 while the other gear is keyed to a vertical extending shaft 26. The shafts 24 and 26 are thereby rotated at equal speeds. The shaft 26 extends upwardly through the housing 19, being rotatably mounted in both the housing and the top plate 12.

Referring now to Figure 6, I have shown a Geneva motion gear which is composed of a male driving member 27, which is keyed to the upper end of the shaft 26 within the housing 19. The member 27 is provided with a conventional driving roller 28, which is adapted to enter successively five slots 29, which extend radially from, and are equally spaced around a female driven member 30. The driven member 30 is fixedly secured to a table 31, which table is rotatably mounted in a central cylindrical opening in the top plate 12. It will be noted that when the driven member 30 is secured to the table 31 the unit is rotatably mounted to rotate in a fixed position upon the plate 12. A tubular column 32 is fixed to the bottom wall of the housing 19 and extends upwardly through axial openings in the driven member 30 and in the table 31, respectively, to a position from one to two feet above the table 31. An operating shaft 33 is reciprocally mounted within the bore of the column 32, the lower end of the shaft 33 being fixed to the central portion of the beam 18 while the upper end of the shaft projects beyond the top of the column 32.

The operation of the device, as so far described, is as follows:

The motor 13 drives the speed reducer 14, which rotates the cranks 16 at a reduced speed, thereby reciprocating the shaft 33 within the column 32. The shaft 26 is rotated in synchronism with the cranks 16 and drives the male member of the Geneva motion through one revolution for each complete cycle of the shaft 33. Consequently, the table 31 is intermittently rotated through one fifth of a revolution for each cycle of said shaft. It will be apparent that the table 31 is stationary during approximately two thirds of each cycle, and the device is so timed that the table moves only when the shaft 33 is near the top portion of its stroke.

The table 31 is provided with five radially extending ways 34, upon each of which a slide 35 is reciprocally mounted, each of these slides being retained in position by means of a pair of gibs 36. A lug 37 projects downwardly from each of the slides 35 through elongated slots in the table 31, and a roller 38 is rotatably mounted in the lower end of each lug 37. A compression spring 39 is interposed between each lug 37 and a bracket 40 which is fixed to the table 31, whereby the slides 35 are each resiliently urged toward the center of the table.

Figure 2:
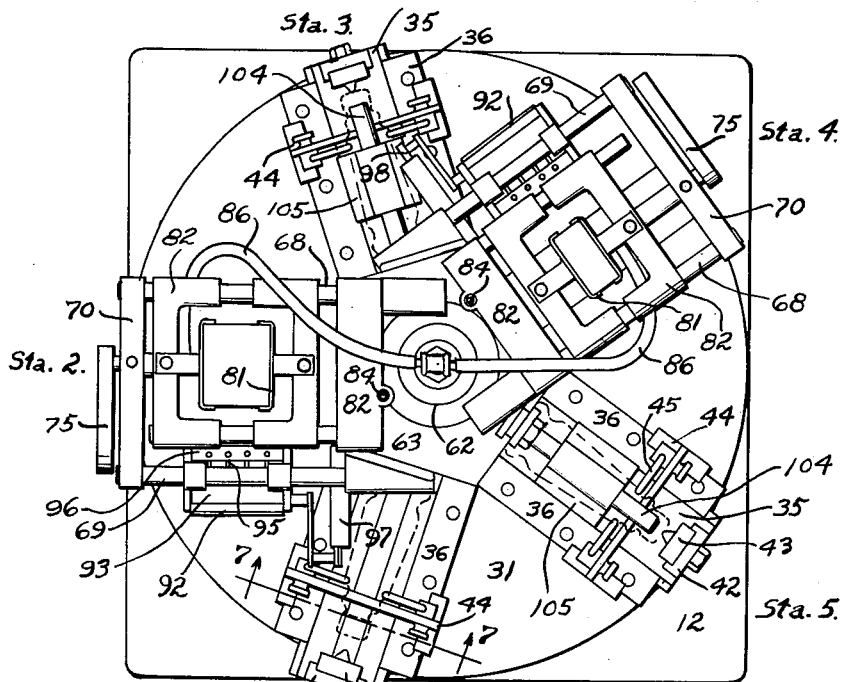
Figure 2 is a plan view of the machine, shown in Fig. 1.

It will be noted from Figure 2 that five stations have been designated around the table, these stations being marked 1, 2, 3, 4 and 5 respectively. The station 1 is used for loading and un-loading the bottles, while at the stations 2 and 4 labels are placed on the respective sides of the bottle, and at stations 3 and 5 the labels are pressed into contact with the bottles over their full surfaces.

In order to load and un-load the bottles it is necessary that the slides 35 be pushed outwardly when at station 1. Consequently a cam 41 is fixed to the top plate 12 in alignment with this station. The cam is so contoured that each roller 38 contacts with its face as the table turns, to thereby push each slide outwardly as it becomes aligned with station 1. An adjusting bracket 42 is slidably mounted upon each of the slides 35, and an adjustable support 43 is mounted upon the bracket 42. This support is adapted to bear against the outer end of each bottle so as to resiliently urge the bottle inwardly against a bottle holding fixture which will subsequently be described.

Referring to Figure 7, it will be noted that a slide 44 is mounted upon the outer edges of the gibs 36, and that a pair of adjustable pins 45 are secured in this slide, which pins extend upwardly and inwardly so as to center the bottle in its correct position. Although the slides 44 are adjustable, they do not move with the slides 35 but remain fixed for each adjustment.

The neck portions of all bottles, even flat or irregularly shaped, are round, so that when such bottles are to be labeled the pins 45 should be adjusted to bear against the round neck, thereby allowing the bottle to be rotated. These pins also hold the bottle lengthwise until the support 43 contacts with the cap.

Figure 4:
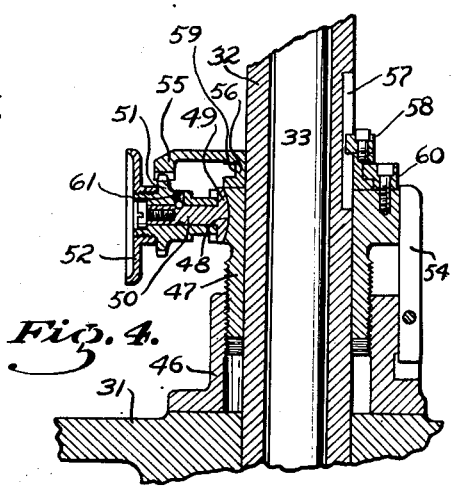
Figure 4 is a sectional view, taken on the line 4—4 of Figure 3.
Figure 5:
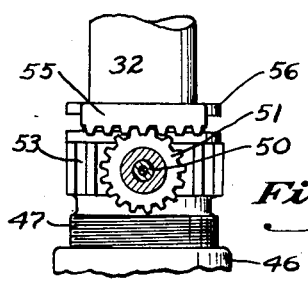
Figure 5 is a side elevation of the bottle holder which is shown in Figures 3 and 4, illustrating the rack and pinion of the rotating device.

Referring to Figure 4, I have shown the fixture which supports the inner ends of the bottles. This fixture comprises a cylindrical member 46 which is fixedly secured to the table 31 around the column 32 and in which an adjustable sleeve 47 is threaded. The upper end of sleeve 47 is provided with five cylindroidal bearing surfaces 48, equally spaced therearound, and in each of which a shoe 49 is adapted to be fixed. The axis of each cylindroidal surface and associated shoe extends in a horizontal direction and is tangent to a circle which lies about two inches outside of the periphery of the sleeve 47. Each shoe 49 has a shaft 50 formed integrally therewith, which shaft extends radially from the sleeve 47. Upon each shaft 50 a gear 51 is rotatably mounted, while a flanged bottle holder 52 is fixed to the outer end of each gear 51. It will be noted that the axis of each cylindroidal surface 48 intersects the axis of the associated gear at the center thereof, the purpose of which is to minimize distortion in the meshing of the gear teeth as the shoe is adjusted to accommodate tapered bottles.

Figure 4 shows the bottle holder extending horizontally away from the sleeve 47 in the position where cylindrical bottles are accommodated. However, in Figure 1, the bottle holder has been tipped slightly upwardly to accommodate a tapered bottle. Each shoe 49 is clamped in its desired position when the device is adjusted for a particular shape of bottle, and is thereafter allowed to remain in this position. The shoes may be rocked in either direction to accommodate bottles which are tapered in either direction.

Figure 3:
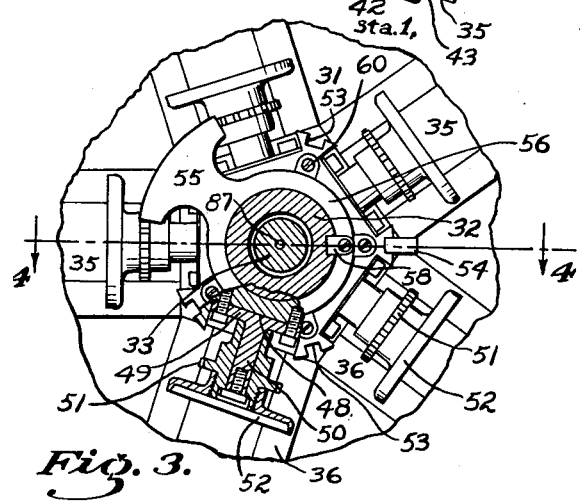
Figure 3 is a sectional view, taken on the line 3—3 of Figure 1, showing the bottle rotating mechanism.

The lower portion of the sleeve 47 is threaded so that it may be raised or lowered into the member 46. When the sleeve 47 is threaded downwardly in the member 46, a larger diameter bottle may be accommodated and vice versa. As shown in Figure 3, the upper portion of the sleeve 47 is provided with five vertically extending key ways 53, while a key 54 is detachably secured to the member 46. This key is adapted to enter any one of the five key ways 53 when the sleeve 47 is rotated to the correct position. When a larger size of bottle is to be labeled, the key 54 is removed and the sleeve 47 is screwed downwardly into the member 46 until the correct height for the holders 52 is obtained. The device is then rotated slightly until the key 54 fits into the nearest key way 53 and the key is then locked in position. When in this locked position the member 46, sleeve 47 and holders 52 rotate as a unit with the table 31.

The purpose of the gear 51 is to rotate each bottle holder 52, as the holders move successively between the stations 3 and 4. This is accomplished by providing an arcuate rack 55, which is formed upon a collar 56, the collar being reciprocally mounted upon the column 32. A vertically extending key way 57 is machined in the column 32, while a key 58 is fixed to the collar 56 and extends into this key way to prevent rotation of the rack on the column. An annular groove 59 is provided around the collar 56, and a plurality of lugs 60 are fixed to the upper end of the sleeve 47 and project into the groove 49. The aforementioned construction insures that the rack 55 maintains a fixed vertical position relative to the gears 51 upon the vertical adjustment of the sleeve 47, while at the same time preventing the rack from rotating as the sleeve 47 moves with the table. Each holder 52 is maintained in one of its rotary positions by a spring detent 61, and is maintained in this position while the table moves from stations 1 to 3. However, when the table moves each holder from stations 3 to 4, the gear 51 co-acts with the rack 55 to thus rotate the gear one half of a revolution. The spring detent 61 then snaps into a diametrically opposed depression in the opposite side of the shaft 50, to thus resiliently maintain the holder in this new position for another complete revolution of the table.

From the foregoing, it will be seen that upon each slide 35 moving into alignment with station 1, it is pushed outwardly by the cam 41 so that the operator may remove the bottle therefrom and place a new bottle in position. The table then swings this bottle successively to stations 2 and 3, where a label is placed upon it and pressed into position, respectively, then the bottle is rotated through 180° by means of the rack 55, and then a second label is applied and pressed on the opposite side of the bottle so that when it returns to the station 1 labels have been applied to both sides of the bottle.

That portion of the machine which applies the labels to the bottles will now be described.

Referring to Figure 1, it will be noted that a sleeve 62 is fixed to the upper end of the shaft 33 and extends down over the column 32 where it is fixed to a five sided head 63 so that as the shaft 33 is reciprocated the head 63 is also reciprocated. The five flat sides of the head 63 are aligned with the five stations of the machine, the sides which are aligned with stations 2 and 4, having label applying devices secured thereto. Inasmuch as these two label applying devices are practically identical, only one of these devices will be described. The flat sides which are aligned with stations 3 and 5 have identical label pressing devices fixed thereon.

Referring to one of the label applying devices, it will be noted in Figure 11 that a pair of guide rods 64 extend upwardly through a rectangularly shaped opening in the respective face of the head 63, upon which rods a slide 65 is reciprocally mounted. A shaft 66 is rotatably mounted in the slide 65 in a horizontal position, the inner end of which shaft has a gear 67 fixed thereto. A pair of supporting bars 68 and 69, respectively, project outwardly from the face of the head 63 and a bracket 70 connects the outer ends of these two bars. A bearing 71 is reciprocally mounted in the bracket 70, the lower end of which rotatably supports the shaft 66, while a spring 72 urges the bearing 71 downwardly. It will be noted that the slide 65 may be moved vertically upon the rods 64, at which time the bearing 71 moves a like distance against the resistance of the spring 72.

Referring to Figure 10, I have shown a rack 73 which is mounted, for a limited reciprocation, in a vertical direction in the head 63 in position to mesh with the gear 67. The lower end of the rack 73 is loosely anchored in a collar 74, which is fixed to the column 32. As the head 63 moves upwardly from the position shown in Figure 10, the rack 73 is likewise moved upwardly until the adjusting nuts upon its lower end co-act with the bottom of the collar 74. Upon further upward movement of the head 63, the gear 67 is forced to rotate, the rack then being held stationary by the adjusting nuts and collar 74. The parts are so proportioned that the upward movement of the head 63 causes the gear 67 to rotate through ½ of a revolution. An eccentrically disposed weight 75 is fixed to the outer end of the shaft 66 in such position that when the head is at the bottom of its stroke the weight is in the position shown in Figure 13. As the head starts to rise, the rack is moved upwardly together with the slide 65 due to the center of gravity of the weight 75 more than counteracting the weight of the rack 73, and then upon further raising of the head the shaft 66 is rotated through ½ of a revolution. It will be noted that as the weight 75 swings past the vertical center through the device, it also rotates the shaft 66 faster than would the rack 73 which thereby forces the rack 73 downwardly to its lowermost position. In like manner, upon the head returning downwardly, the weight 75 holds the shaft from rotation until the clearance at the lower end of the rack is taken up, at which time further downward movement of the head causes the shaft 66 and weight 75 to return to the position shown on Figure 13.

A plate 76 is fastened to the shaft 66 adjacent to the slide 65, this plate having a pair of supports 77 projecting outwardly therefrom. A label carrier 78 is adjustably clamped to the supports 77 so that it will rotate with the shaft 66. As shown in Figure 9, a pair of stop members 79 extend from the slide 65 in position to co-act with suitable lug upon the plate 76 so that the oscillating movement of the plate 76 is limited to 180°. At one extreme position of oscillation the label carrier 78 extends downwardly while at the other extreme position it projects upwardly. A rubber pad 80 is fixed to the outer surface of the carrier 78, which pad is adapted to convey and apply the labels to the bottles.

From the foregoing it will be seen that the first portion of upward movement of the head 63 raises the slide 65 together with the label carrier 78 upwardly a distance equal to the spacing between the collar 74 and the adjusting nuts on the rack 73. The center of gravity of the weight 75 is offset more than sufficient to counterbalance the weight of the rack 73 so that the rack is always lifted in preference to the carrier rotating. Only when the adjusting nuts strike the bottom of the collar 74 will the shaft 66 and gear 67, together with the carrier 78, begin to rotate. After rotation through 45 degrees, the center of gravity of the weight 75 is aligned with the vertical center line through the carrier so that further movement causes the center of gravity to pass to the left of the center line, as shown in Figure 13. Shortly before the carrier 78 approaches the vertical center line, the weight 75 becomes effective to rotate the shaft 66, carrier 78 and gear 67 faster than would the rack 73 alone. The weight 75 swings the unit around until it is stopped by the stop 79. This accelerated rotation of the carrier, as it approaches the top of its movement, pushes the rack 73 downwardly to substantially the position shown in Figure 10. However, as the head 63 rises still further, the carrier being held stationary by the stop 79, the rack 73 is lifted bodily with the head through the last half inch of movement.

Upon the downward movement of the head 63, the center of the gravity of the weight 75 is on the left hand side of the centerline, opposite to that shown in Figure 13, so that it retains the carrier in its upper position until the carrier and rack and head to move together downwardly a sufficient distance to cause the body portion of the rack to strike against the upper face of the collar 74. Upon further downward movement of the head 63, the rack 73 causes the carrier and weight 75 to rotate clockwise through about 45 degrees of rotation or until the center of gravity of the weight passes through the vertical center line of the machine. The weight 75 and carrier then swing over until stopped by the other stop 79, or until the adjusting nuts on the rack 73 strike against the bottom of the collar 74. The rack 73 is, of course, lifted when the unit rotates due to its own weight. Further downward movement of the head 63 simply moves the rack downwardly as a unit with the head.

When the carrier strikes against the container to be labeled, the pad 80 is somewhat compressed, but the main compensation occurs by the slide 65 moving upwardly upon the guide bars 64. This movement is resisted by both springs 72 and 83.

The action just described is extremely important in connection with the operation of this device, as it insures that the shaft 66 remains stationary, that is, not rotating, both at the top and bottom of the stroke of the machine. This action prevents rotation of the label carrier when it is drawing a label from the label container, about to be described, and when it is applying and pressing the label on to the work.

It will be noted that a label holder or container 81 is mounted in a suitable frame 82, which frame is rotatably mounted upon the rod 68. A spring 83 resiliently urges the frame 82 upwardly at all times. From Figures 10 and 11, it will be seen that a tension rod 84 has its lower end fastened to the collar 74, while its upper end is adapted to co-act with a socket in the free end of frame 82 so that as the head 63 is moved through the upper inch of its travel the rod 84, being stationary, will draw the frame 82 downwardly to a substantially level position. During the upper one half inch of travel of the head the label carrier 80 is held against rotation, due to the weight 75 having caused it to complete its oscillating movement, so that the non-rotating rubber pad 80 of the carrier is pressed up against the container 81. Means, which will subsequently be described, is associated with the carrier, which picks off a label from the under side of the container 81 so that upon the downward movement of the head 63 through the first half inch of travel, the frame 82 and container 81 are held near their uppermost positions, so that the label which is retained by the carrier is moved from the bottom of the container upon the downward movement of the carrier. Rotation of the carrier to the position shown in Figure 9 is thereafter accomplished without interference of the label with the container 81. An important feature of my device is that the label carrier has an arcuate face, so that the label may be pressed down into a relieved panel in the bottle. Such operation cannot be accomplished with any other labeling machine known to the applicant.

The means associated with the label carrier for picking off each label from the container comprises a series of small openings 85 which are connected by means of a flexible hose 86 with an opening 87 which extends downwardly through the shaft 33. The lower end of the opening 87 is connected by means of a second flexible hose 106 with a poppet valve 88 which is secured to the gear housing 21. A cam 89 is fixed to the outer end of the shaft 24, which actuates the poppet valve 88 in synchronism with the reciprocating movement of the shaft 33. A vacuum pump 90 is fixed to the base plate 10 and is continuously driven by means of a V-belt 91, the vacuum port of the pump being connected to the poppet valve 88 by means of a hose 107. The cam 89 is so designed that the valve 88 is opened only upon the downward movement of the head 63. During the upward movement of this head the valve is closed so that vacuum is created upon in the openings 85 only during the downward movement of the head.

From the foregoing, it will be seen that reciprocation of the head 63 upwardly causes the carrier first to move away from the bottle and then to rotate through 180° in a counterclockwise direction. The pad 80 is then pressed upwardly against the label container 81. At this time the vacuum from the pump 90 is impressed upon the openings 85 to thereby grip the bottom label in the container. The downward movement of the head 63 through the first half inch causes the carrier to move away from the container, thereby drawing the bottom label out of the container, and further downward movement rotates the container clockwise to its lowermost position above the bottle. The last half inch of movement of the head applies the label to the bottle. If the bottles are not accurately sized, or if the machine is not adjusted for the exact size of the bottle, the slide 65, shaft 66 and label carrier 78 will slide upwardly upon the rods 64 to compensate for this inaccuracy. It will be, of course, apparent that the table 31 moves only during the upper portion of the head's stroke, so that when the label is applied to the bottle the same is held stationary in position therebeneath.

The means for applying glue to the back side of each label will now be described.

A glue container 92 is mounted for oscillation upon the rod 69, this container having a roller 93 rotatably mounted therein beneath the level of the glue. A second serrated roller 94 is rotatably mounted within the container 92 in position to bear against the roller 93, which roller 94 is formed of resilient rubber, and, in the device shown, is provided with four annular grooves therein. Four guide wires 95 extend from a bracket 96 at the upper portion of the container downwardly so as to lie within these grooves in the roller 94. The purpose of the wires 95 is to prevent the labels from adhering to the glued surface of the roller 94 as the labels are conducted against this glued surface. As each label is carried from the container 81 downwardly, the back side of the label contacts with the roller 94 so that the glue upon the surface of this roller is transferred to the label. The guide wires 95 insure that the leading edge of the label is drawn away from the roller so as to remain with the label carrier.

Upon the return or upward movement of the carrier 78, it is essential that the glued roller 94 be moved away from the face of the carrier in order that the glue will not be applied to the carrier face and then to the front of the label. In order to accomplish this, I have provided the device shown in Figures 12 and 15. This device comprises a bracket 97 which is fixed to the head 63 and in which a slide 98 is reciprocally mounted to move in a horizontal position, the outer end of which slide is connected to the glue container 92 by mean of a link 99. A dog 100 is pivotally mounted upon the inner end of the slide 98, this dog having an ear 101 which extends into position to co-act with an arcuate cam 102 which is formed around the periphery of the plate 76. A tension spring 103 urges the dog 100 into the position, shown in Figure 12. When the cam 102 is rotated counter-clockwise from the position shown in Figure 12, the leading edge thereof strikes against the ear 101 and moves the dog 100 and slide 98 outwardly a sufficient distance for the cam to slide past the ear. This movement swings the glue container outwardly by means of the link 99. Upon the return movement of the cam 102 in a clockwise direction, the opposite edge of the cam strikes against the inside surface of the ear 101 and swings the dog 100 upwardly against the tension of the spring 103 so that it rides inside of the cam 102. This return movement of the cam holds the glue container in position. Thus, the glue container is held in its inner position while the label carrier is conveying the label downwardly from the label container, but is moved outwardly as the carrier returns for another label.

It will be noted that at stations 3 and 5 means for pressing the labels to the bottles are provided. Each of these devices comprises a support 104 which extends horizontally from the adjacent flat face of the head 63, and which is adjustable vertically to accommodate various sizes of bottles. Mounted upon each support 104 I have provided a thick sponge rubber pad 105, which is adapted to bear against each bottle as the head 63 moves to its lowermost position. The carrier 78 applies the labels to the bottles only at their center points so that it is required that the pads 105 press the labels downwardly around the bottles over their full area to provide a neat and uniformly applied label.

Among the many advantages arising from the use of my improved machine, it may be well to mention that the labels are gummed over their full surface, which distinguishes the device from all other machines known to the applicant. This allows the machine to be used on that class of work which has, heretofore, been labeled by hand. Furthermore, the machine is adapted to take tapered, round, square or flat bottles, and is also adapted to secure labels to both sides of such bottles when desired.

Some changes may be made in the arrangement, construction and completion of the various parts of my improved device without departing from the spirit of my invention, and it is my intention to cover by my claims such changes as may reasonably be included within the scope of my invention.

I claim as my invention:

1. A labeling machine of the character described, comprising a holder for the container to be labeled, a label holder, a label carrier rotatably and reciprocally mounted in position between said container and said label holder, means for reciprocating said carrier into and out of contact with said label holder and then simultaneously reciprocating and rotating said carrier to position spaced from said container holder and then reciprocating said carrier into and out of contact with said container, and means associated with said carrier for conveying a label from said label holder to said container.

2. A labeling machine of the character described, comprising a holder for the container to be labeled, a label holder, a label carrier rotatably mounted in position between said container and said label holder, means for simultaneously reciprocating and rotating said carrier from position adjacent to said label holder to position adjacent to said container, vacuum operated means associated with said carrier for picking off a label from said label holder and conveying it therewith to position adjacent to said container and a valve adapted to control said vacuum operated means, said valve being actuated in timed relationship with said carrier rotating means, whereby said vacuum operated means is effective only when the carrier rotates from the label holder to the container.

3. A device of the character described, comprising a holder for the container to be labeled, a label holder, a label carrier rotatably and reciprocally mounted in position between said container holder and said label holder, means for swinging said label holder into and out of engagement with said carrier, then rotating and reciprocating said carrier to position spaced from said container holder and then reciprocating said carrier into and out of contact with said container, vacuum operated means associated with said carrier for picking off a label from said label holder and conveying it therewith to position adjacent to said container, and a valve adapted to control said vacuum operated means, said valve being operated in timed relationship with said reciprocating and rotating means.

4. A labeling machine of the character described, comprising a holder for the container to be labeled, a label holder, a label carrier rotatably and reciprocally mounted in position between said container and said label holder, means for swinging said label holder into and out of contact with said carrier and then simultaneously reciprocating and rotating said carrier to position adjacent to said container holder and then reciprocating said carrier into and out of contact with said container, and means associated with said carrier for picking off a label from said label holder and conveying it therewith to position adjacent to said container.

5. A labeling machine of the character described, comprising a holder for the container to be labeled, a label holder, a label carrier rotatably and reciprocally mounted between said container and said label holder, a gear fixed to said carrier, a relatively stationary rack in mesh with said gear, means for reciprocating said carrier relative to said rack, so as to rotate said carrier from position adjacent to said label holder to position adjacent to said container, and means associated with said carrier for conveying a label therewith from said label holder to said container.

6. A labeling machine of the character described, comprising a frame, a container supporting table rotatably mounted upon said frame, said table having a plurality of container holders spaced therearound, each of which holders is adapted to support a container therein, means for intermittently rotating said table, said intermittent rotating means stopping said table at a plurality of stations corresponding to the number of container holders upon said table, means for successively releasing each of said container holders as it becomes aligned with one of said stations, means for successively carrying a label to position adjacent to each of the container holders at each of two other of said stations, and means for rotating said container holder through one half of a revolution as the table rotates from one of said label applying stations to the other of said label applying stations.

7. A labeling machine of the character described, comprising a frame, a container supporting a table rotatably mounted upon said frame, said table having a plurality of container holders angularly spaced therearound, with each of said holders supporting a container therein, means for intermittently rotating said table through an arc corresponding to the angular spacing of said holders, a head reciprocally mounted upon said frame for axial movement in relation to said table, a label holder mounted upon said head, a label carrier mounted upon said head, said carrier being rotated from position adjacent to said label holder when said head is moved furthest from the table to position adjacent to said container holders when said head is nearest to said table, means associated with said label carrier for conveying a label from said label holder to said container, said head being reciprocated in time relation with the means for intermittent rotating of said table, whereby said table is rotated only when said head is at the outermost portion of its reciprocation.

8. A labeling machine of the character described, comprising a holder for the container to be labeled, a label holder, a label carrier rotatably and reciprocally mounted in position between said container holder and said label holder, actuating means for rotating said carrier from position adjacent to said label holder to position adjacent to said container, means associated with said carrier for picking off a label from said label holder and conveying it therewith to position adjacent to said container, a stop associated with said machine, an eccentrically disposed weight fixed to said carrier, in such position that upon said actuating means rotating said carrier to position adjacent to said container, said weight will pass over the axis of said carrier and rotate said carrier to position against said stop, and means for reciprocating said carrier into contact with said container while said carrier is in said position against said stop.

9. A device, as claimed in claim 8, wherein said carrier is simultaneously rotated and reciprocated between said label holder and said container.

10. A labeling machine of the character described comprising, a holder for the container to be labeled, a label holder, a label carrier rotatably mounted in position between said container holder and said label holder, means for rotating said label carrier through substantially 180 degrees from position adjacent to said label holder to position adjacent to said container holder, means for causing relative reciprocation between said carrier and said label holder when said carrier is positioned adjacent to said label holder, means for causing relative reciprocation between said carrier and said container holder when said carrier is positioned adjacent to said container holder, and means associated with said carrier for conveying a label from said label holder to said container holder.

11. In a labeling machine, a holder for the container to be labeled, a label holder, a label carrier rotatably and reciprocally mounted in position between said container holder and said label holder, means for rotating said label carrier through substantially 180 degrees from position adjacent to said label holder to position adjacent to said container holder, means for causing relative reciprocation between said carrier and said label holder when said carrier is positioned adjacent to said label holder, means for reciprocating said carrier into contact with the container in said container holder when said carrier is positioned adjacent to said container holder, and means associated with said carrier for conveying a label from said label holder to said container holder.

12. In a labeling machine, a label holder, a label carrier rotatably and reciprocally mounted adjacent to said holder, cyclic means for causing relative reciprocation between said holder and said carrier and then causing said carrier to be rotated through substantially 180 degrees and then causing said carrier to be reciprocated into contact with the container to be labeled, and means associated with said carrier for conveying a label thereon during the functioning of said cyclic means.

13. In a labeling machine, a label carrier rotatably and reciprocally mounted in said machine, means for reciprocating said carrier from a label loading position to a label applying position, means for rotating said carrier through substantially 180 degrees during only a portion of said reciprocating movement, and means for conveying a label on said carrier during said entire reciprocating and rotating movements.

14. In a labeling machine, a head mounted for vertical reciprocation in said machine, a label carrier rotatably mounted upon said head, a label holder mounted upon said head, cyclic means for vertically reciprocating said head and conveying a container to be labeled in timed relationship therewith during each cycle to position beneath said head, said means rotating said carrier from position adjacent to said label holder to position adjacent to one of the containers and then causing relative reciprocation between said carrier and the container to be labeled, and means associated with said carrier for conveying a label during each of said cycles from said label holder to the container to be labeled.

WILLIAM B. LOCKE.